(12) United States Patent
Watanabe

(10) Patent No.: US 8,031,354 B2
(45) Date of Patent: Oct. 4, 2011

(54) IMAGE COMMUNICATION APPARATUS FOR DETERMINING A CORRECT DESTINATION LOCATION OF IMAGE DATA

(75) Inventor: Akinori Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 11/956,577

(22) Filed: Dec. 14, 2007

(65) Prior Publication Data

US 2008/0151297 A1    Jun. 26, 2008

(30) Foreign Application Priority Data

Dec. 21, 2006    (JP) .................... 2006-344394

(51) Int. Cl.
*G06K 1/00*    (2006.01)
(52) U.S. Cl. ...................... 358/1.15; 358/407
(58) Field of Classification Search .......... 358/1.1, 358/1.15, 400, 401, 407, 404, 434, 435, 436, 358/444, 471, 474; 379/100.01, 100.09
See application file for complete search history.

(56) References Cited

U.S. PATENT DOCUMENTS 5,157,514 A * 10/1992 Yoshioka ................ 358/407
5,216,517 A *  6/1993 Kinoshita et al. .......... 358/400
5,585,854 A * 12/1996 Makino .................... 358/407

FOREIGN PATENT DOCUMENTS

| JP | H05-276294 A | 10/1993 |
| JP | H08-307636 A | 11/1996 |
| JP | 2000-022921 A | 1/2000 |
| JP | 2005-94662 A | 4/2005 |

OTHER PUBLICATIONS

U.S. Appl. No. 11/956,077, filed Dec. 13, 2007.

* cited by examiner

*Primary Examiner* — Thomas D Lee
(74) *Attorney, Agent, or Firm* — Canon USA Inc IP Division

(57) ABSTRACT

An image communication apparatus capable of communicating with external apparatuses determines whether image data received from the external apparatuses is a first type of image data that was to be transmitted to the image communication apparatus or a second type of image data that was to be transmitted to other image communication apparatuses, and performs predetermined processing based on the determination result.

10 Claims, 10 Drawing Sheets

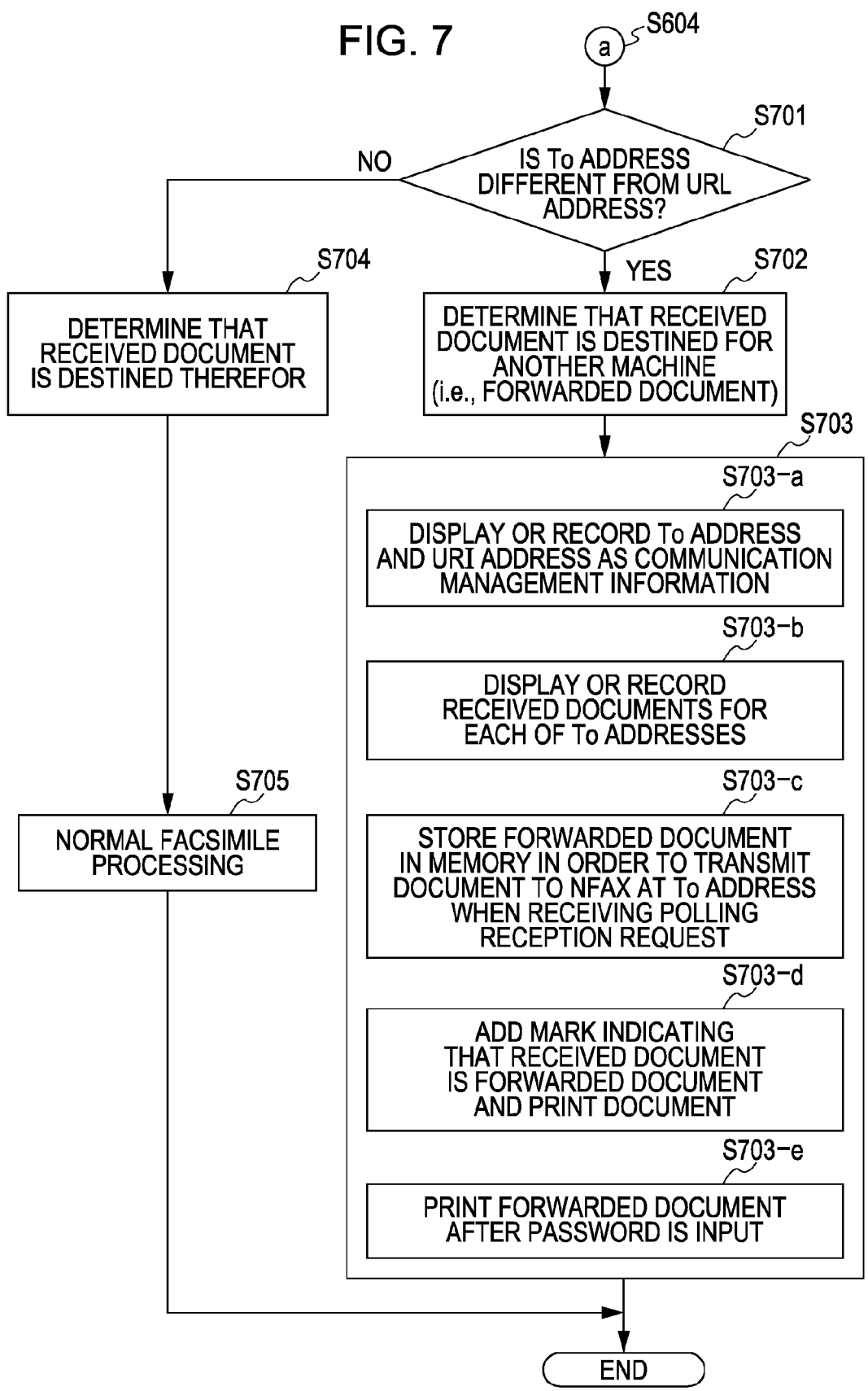

FIG. 8

\*\*\*\*\*\*\*\*\*\*\*\*\*\*\*\*\* COMMUNICATION MANAGEMENT REPORT \*\*\*\*\*\*\*\*\*\*\*\*\*\*\*\*\*

TO ADDRESS: sip:1111@xxx.yy

| RECEIVED TIME | URL ADDRESS | FROM ADDRESS | RECEPTION NUMBER | COMMUNICATION MODE | FILE |
|---|---|---|---|---|---|
| 04/17 20:22 | sip:2222@xxx.yy | sip:3333@zzz.yy | 3371 | RECEPTION T.38 | 04172022 |
| 04/17 20:30 | sip:2222@xxx.yy | sip:4444@aaa.yy | 3401 | RECEPTION T.38 | 04172030 |

TO ADDRESS: sip:1234@xxx.yy

| RECEIVED TIME | URL ADDRESS | FROM ADDRESS | RECEPTION NUMBER | COMMUNICATION MODE | FILE |
|---|---|---|---|---|---|
| 04/19 12:00 | sip:2222@xxx.yy | sip:3333@zzz.yy | 3377 | RECEPTION T.38 | 04191200 |

IMAGE COMMUNICATION APPARATUS FOR DETERMINING A CORRECT DESTINATION LOCATION OF IMAGE DATA

BACKGROUND OF THE INVENTION

1. Field of the Invention

The present invention relates to an image communication apparatus for receiving image data from an external device via a network and a method for controlling the image communication apparatus.

2. Description of the Related Art

To communicate information among remote offices, image data is transmitted and received using facsimile machines. The facsimile machines transmit and receive image data over a public switched telephone network (PSTN) using a protocol in conformance with ITU-T T.30.

In addition to using facsimile machines, recently, image data has been transmitted and received using an e-mail by attaching the facsimile-based image data to the e-mail in accordance with the protocol in conformance with ITU-T T.37. In this communication method, since data is transmitted and received via an Internet protocol (IP) network, image data can be transmitted and received at a cost lower than that required for the facsimile communication in accordance with the protocol in conformance with ITU-T T.30.

Furthermore, a real-time Internet facsimile communication (hereinafter referred to as "IP-FAX communication") has been developed in which facsimile data is transmitted and received in real time via an IP network using an ITU-T T.38 protocol. More specifically, a facsimile machine at a transmission side is directly connected to a facsimile machine at a reception side via an IP network so that a facsimile signal in conformance with ITU-T T.30 is converted to TCP/IP packets and is transmitted and received.

In the above-described IP-FAX communication, the call control procedure based on ITU-T H.323 is employed. Recently, session initiation protocol (SIP), which is similar to ITU-T H.323 protocol, has garnered increased attention.

When comparing the call control procedure in conformance with ITU-T H.323 with SIP, ITU-T H.323 protocol is more complicated since ITU-T H.323 includes a variety of sub-protocols. In contrast, SIP defines only basic session control sub-protocols, such as sub-protocols for starting, changing, and ending a session. Accordingly, SIP is relatively simplified. Consequently, SIP is highly flexible and can be easily integrated into other systems.

SIP includes a user agent, which is a user terminal (e.g., an IP telephone), and a SIP server. The term "SIP server" collectively refers to a proxy server, a redirect server, and a registrar server. Therefore, for example, the alternative address of a facsimile machine on a reception side can be registered using the redirect server.

More specifically, in the case where a particular facsimile machine on a reception side is specified as a destination address of image data, another facsimile machine is registered with a redirect server as a forward address of the image data. Thus, when a facsimile machine on a transmission side transmits image data to the particular address, the alternative address is read out from the redirect server. Subsequently, a call connection is started so that a connection between the facsimile machine on a transmission side and a facsimile machine at the alternative address is established. The facsimile machine on a transmission side then transmits the image data to the facsimile machine at the alternative address (refer to, for example, Japanese Patent Laid-Open No. 2005-94662).

However, in the case where, as described above, an alternative address is registered with the redirect server and image data is transferred, the following problem arises. That is, when the facsimile machine at the transmission side sends a call request to a facsimile machine located at the address specified by the user, the call request command is forwarded to the facsimile machine located at the alternative address. Thus, a connection with the facsimile machine located at the alternative address is established and, subsequently, the transfer of the image data is started.

At that time, the facsimile machine located at the alternative address, which is specified as a forward address, cannot determine to which address the image data was originally transferred from the facsimile machine at the transmission side. That is, the facsimile machine located at the alternative address cannot determine whether the image data was originally destined for it or another facsimile machine.

That is, the user of the facsimile machine located at the alternative address cannot determine whether the received image data is destined for the facsimile machine of the user or not. Accordingly, ease of use of the facsimile machine is significantly degraded.

In addition, Japanese Patent Laid-Open No. 2005-94662 describes a facsimile machine that, when the facsimile machine transmits image data after changing the destination address of the image data to the alternative address, adds a mark to the image data to be transmitted, indicating that such an operation has been performed. By using this mark, a user of the facsimile machine on the reception side can determine whether the received image data is originally destined for it or another facsimile machine. However, if the facsimile machine on the transmission side does not add the mark indicating that the image data has been transmitted to the alternative address, the user of the facsimile machine on the reception side cannot determine whether the received image data was originally destined for it or another facsimile machine.

SUMMARY OF THE INVENTION

Accordingly, the present invention provides a mechanism of an image communication apparatus on the reception side for easily determining whether the image data received via a network was originally destined for it or another facsimile machine.

According to an aspect of the present invention, an image communication apparatus capable of communicating with external apparatuses includes a receiving unit configured to receive image data from the external apparatuses, a determining unit configured to determine whether image data received by the receiving unit is a first type of image data that was to be transmitted to the image communication apparatus or a second type of image data that was to be transmitted to other image communication apparatuses, and a processing unit configured to perform processing based on the determination result of the determining unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIG. 7 is a flow chart illustrating a first data processing procedure performed by the image communication apparatus according to the first exemplary embodiment.

FIG. 8 illustrates an example printout of a communication management report of the image communication apparatus according to the first exemplary embodiment.

DESCRIPTION OF THE EMBODIMENTS

Exemplary embodiments of the present invention are described below with reference to the accompanying drawings.

System Architecture

Figure 1:
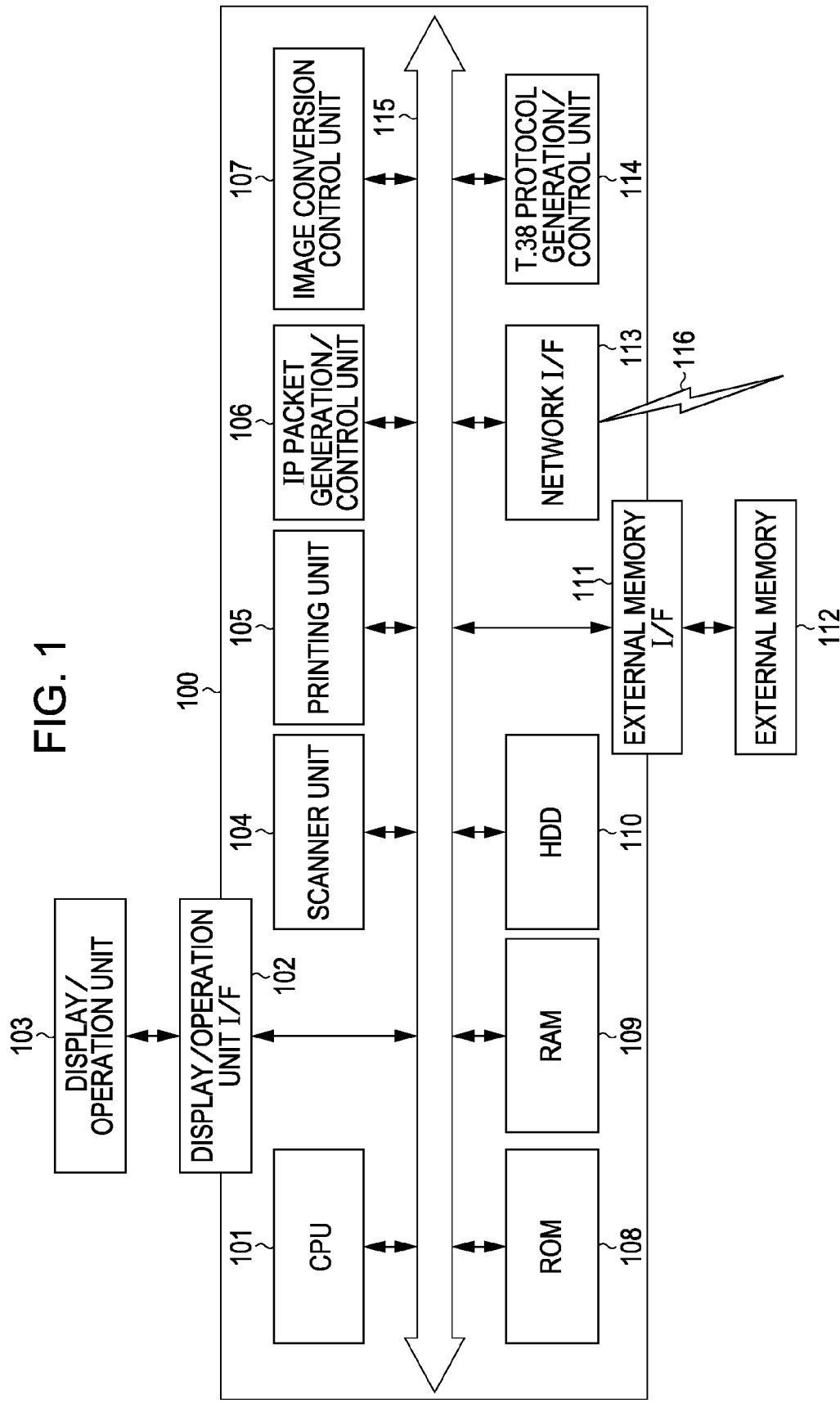
FIG. 1 is a block diagram illustrating the configuration of an image communication apparatus according to a first exemplary embodiment of the present invention.

FIG. 1 is a block diagram illustrating the configuration of an image communication apparatus according to a first exemplary embodiment of the present invention. While the following description is made with reference to a network-based facsimile machine 100 as an example image communication apparatus, any image communication apparatus that communicates image data via a network can be employed. Hereinafter, the network-based facsimile machine is simply referred to as an "NFAX".

As illustrated in FIG. 1, a central processing unit (CPU) 101 controls devices connected to the CPU 101 in accordance with control programs stored in a read only memory (ROM) 108.

A display/operation unit 103 displays user interface information, such as a window, an icon, a message, and a menu, on a display screen thereof via a display/operation unit interface (I/F) 102. The display/operation unit 103 includes a variety of keys used for inputting information and a pointing device used for selecting the icon, the menu, and other objects displayed on the display screen.

A scanner unit 104 scans a document. A printing unit 105 prints print data stored in a random access memory (RAM) 109 or a hard disk drive (HDD) 110. The ROM 108 stores a variety of data in addition to the control programs. One of the control programs is used for executing the procedure represented by a flow chart illustrated in FIG. 7 and a session illustrated in FIGS. 6A and 6B.

The RAM 109 is used for a work area of the CPU 101, a data save area used when error processing is performed, and a control program load area. The HDD 110 serves as an internal storage unit. The HDD 110 stores a variety of control programs and print data. To read and write data from and to an external memory 112, an external memory interface (I/F) 111 is used.

The external memory 112 may be a removable recording medium, such as a universal serial bus (USB) memory. A network I/F 113 enables the image communication apparatus to communicate with a SIP server illustrated in FIG. 2, other information processing apparatuses, and a printer via IP network 116. A CPU bus 115 includes an address bus, a data bus, and a control bus. In the present exemplary embodiment, the control program is supplied from the ROM 108 to the CPU 101.

A T.38 protocol generation/control unit 114 generates facsimile transmission information in conformance with ITU-U T.38 protocol and retrieves facsimile transmission information from received ITU-U T.38 protocol data.

An IP packet generation/control unit 106 maps data in conformable with ITU-U T.38 to an IP packet and retrieves data in conformance with ITU-U T.38 from a received IP packet. An image conversion control unit 107 compresses or decompresses an image transmitted or received in a facsimile format. The image conversion control unit 107 further changes the size and the line density of the image.

Figure 2:
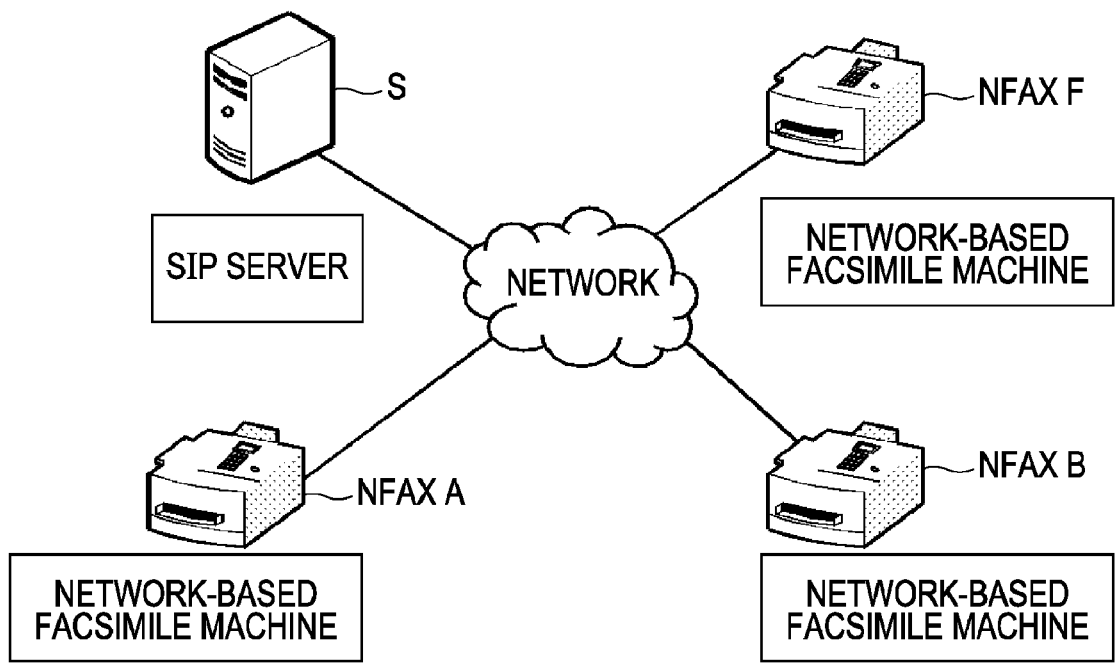
FIG. 2 illustrates an example network system including the image communication apparatus shown in FIG. 1.

FIG. 2 illustrates an exemplary network system including the image communication apparatus illustrated in FIG. 1. For example, the network system includes three NFAXes and a SIP server.

In FIG. 2, an NFAX A, an NFAX B, and an NFAX F are SIP-based facsimile machines. A SIP server S includes four server functions: a proxy server, a registrar server, a location server, and a redirect server. These four server functions are used when executing communication with NFAXes using SIP. The four server functions may be implemented in one server. Alternatively, the four server functions may be implemented in four different servers.

When the NFAX F calls the NFAX A, which is a destination of a facsimile communication, the destination address is specified as follows. In the present embodiment, the destination address is represented using an address expression "sip:ipfax-a@domain.com". This address expression is referred to as a "SIP-URI (uniform resource identifier)".

The "sip:" part is an identifier that indicates the protocol of SIP. The "ipfax-a" part immediately before the letter "@" indicates the ID of a user at the destination of the communication (a SIP user name). The "domain.com" part immediately after the letter "@" indicates the SIP domain.

Figure 3:
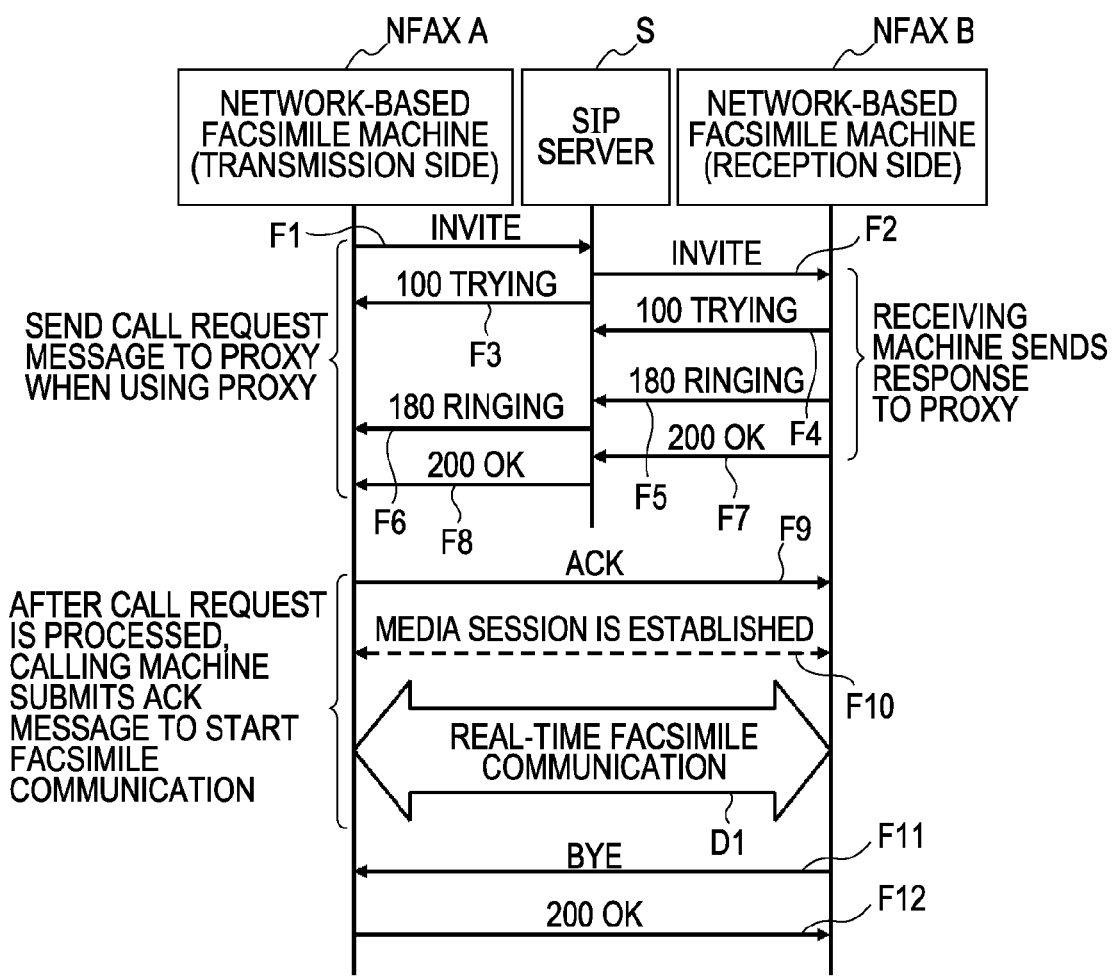
FIG. 3 illustrates a first data communication session in the network system illustrated in FIG. 2.

FIG. 3 illustrates a first data communication session established in the network system illustrated in FIG. 2. A basic communication session flow of SIP performed when the NFAX A on a transmission side calls the NFAX B on a reception side is illustrated in FIG. 3. In FIG. 3, the sessions are represented by "F1" to "F12". The data communication step is represented by "D1". The time-series sessions are depicted from the top down. Similar numbering will be used in describing FIG. 3 as was utilized above in describing FIG. 2.

As illustrated in FIG. 3, a SIP session is established and terminated using a method and a response code.

The NFAX A on the transmission side submits a method INVITE to a proxy server located in a domain A of the NFAX A in order to establish a session (F1). The proxy server is one of the functions provided by the SIP server S.

Upon receipt of the method INVITE, the proxy server returns a response code 100 "Trying" to the NFAX A (F3). The response code 100 "Trying" indicates that the proxy server is forwarding the request to the NFAX B. Concurrently, the proxy server actually forwards the method INVITE to the NFAX B on the reception side (F2).

At that time, like the proxy server, the NFAX B on the reception side returns a response code 100 "Trying" to the proxy server (F4).

In this way, the method INVITE reaches the NFAX B via the proxy server. Upon receipt of the method INVITE, the NFAX B sends a response code 180 "Ringing" to the NFAX A (F5 and F6).

If the NFAX B accepts the call, the NFAX B then sends a response code 200 "OK" to the NFAX A (F7 and F8).

Subsequently, the NFAX A sends a message (a method ACK) indicating that it has received the response to the method INVITE (F9).

Thus, the session is established (F10). After the session is established, a real-time facsimile communication is performed using ITU-T T.38 protocol (D1).

After the facsimile communication is completed, the NFAX B submits a method "BYE" to the NFAX A (F11). The NFAX A returns a response code 200 "OK" corresponding to the method "BYE" to the NFAX B (F12). At that time, the session is terminated.

Figure 4:
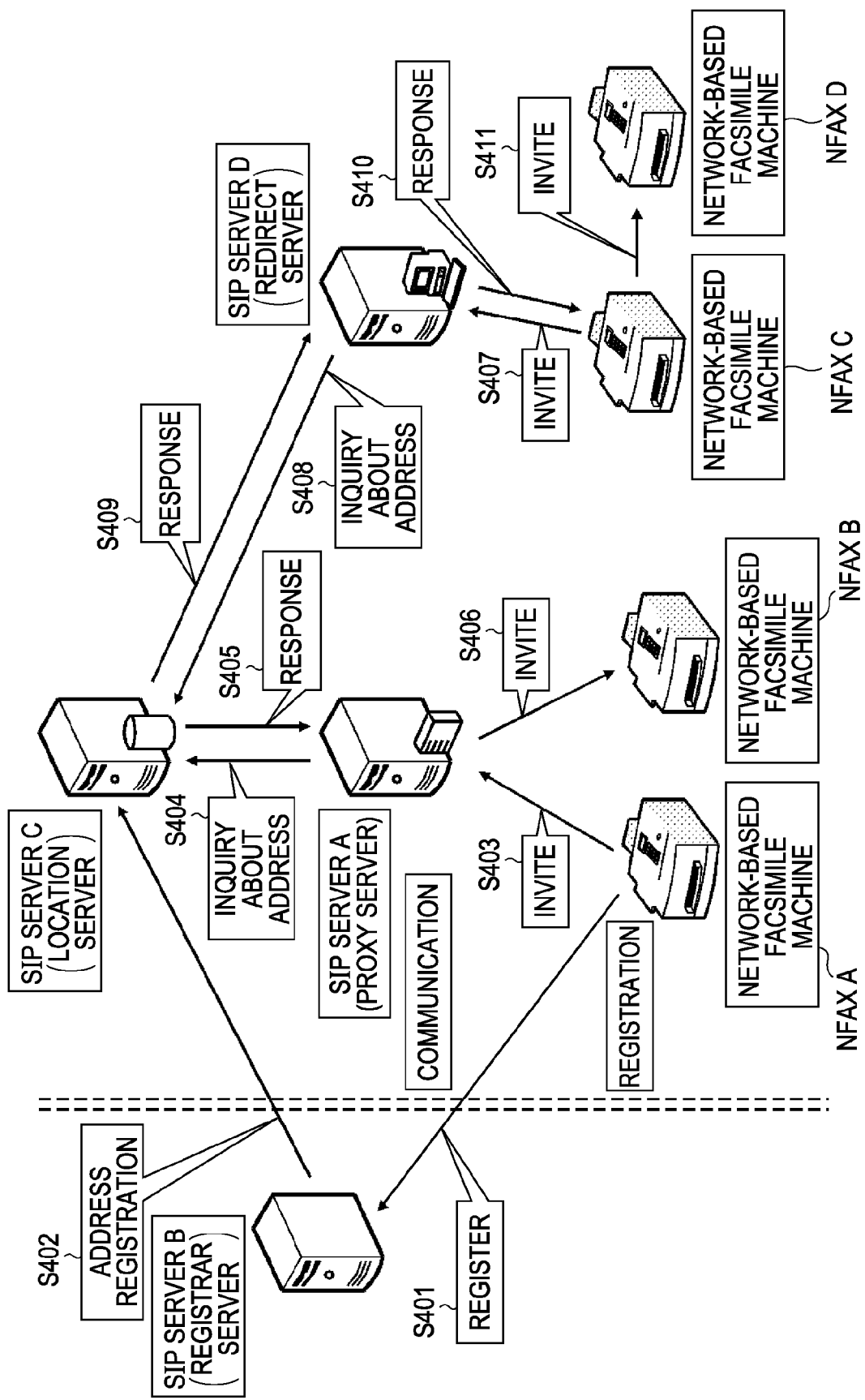
FIG. 4 schematically illustrates a relationship between a SIP server shown in FIG. 2 and an NFAX.

FIG. 4 is a schematic illustration of a relationship between each of the server functions of the SIP server S and each of the NFAXes on the transmission and reception sides. For ease of description, the server functions of the SIP server S are provided by different apparatuses. In addition, each of the server apparatuses is connected to the NFAXes via a network using T.38 protocol. In FIG. 4, communication steps are represented by S401 to S411.

A process flow in which the NFAX A on the transmission side registers the location thereof is described first.

The registrar server (a SIP server B) receives a request for registering the address information about each of the NFAXes from the NFAX. The location server (a SIP server C) stores and manages the address information about each of the NFAXes received from the registrar server (the SIP server B).

Each of the server apparatuses includes hardware resources that a normal computer apparatus has. Each of the server apparatuses is configured so as to be capable of communicating with other apparatuses using T.38 protocol. Examples of the hardware resources include a control unit and a storage unit, such as a hard disk. The control unit incorporates a CPU, a ROM, and a RAM.

In addition, the location server (the SIP server C) responds to a request for referencing the address information received from the redirect server (a SIP server D) and the proxy server (a SIP server A) on the basis of the stored address information therein.

The NFAX A sends the location information (address information) thereof to the registrar server (the SIP server B) using a method "REGISTER" in advance (S401). Thereafter, the registrar server (the SIP server B) registers the sent location information in a storage unit of the location server (the SIP server C) (S402).

A process of calling the NFAX B on the reception side performed by the NFAX A on the transmission side is described next. The method "INVITE" is transmitted from the NFAX A to the proxy server (the SIP server A) first (S403).

Upon receipt of the method "INVITE", the proxy server (the SIP server A) inquires about the location information about the NFAX A corresponding to the specified address to the location server (the SIP server C) (S404). Thus, the NFAX B can be identified (S405).

Subsequently, the proxy server (the SIP server A) transfers the method "INVITE" to the NFAX B (S406). Thereafter, image data is transferred in accordance with the procedure illustrated in FIG. 3.

A process performed when the address (the URI address) of an NFAX D is changed is described next. In this example, an NFAX C on a transmission side calls the NFAX D on a reception side. A new address of each of the NFAXes can be registered with the redirect sever (the SIP server D). That is, when the address of an NFAX is changed, the NFAX can register the new address thereof with the redirect server (the SIP server D). Thus, when another NFAX sends a call request to the NFAX at the old address, the NFAX that sends the call request can acquire the new address by sending an inquiry about the new address to the redirect server.

When the address of the NFAX D has been changed, a method "INVITE" sent from the NFAX C (see S407) is transferred to the redirect sever (the SIP server D). Upon receipt of the method "INVITE", the redirect sever sends an inquiry to the location server (the SIP server C) (S408) and receives a location list including the new address of the NFAX D (S409).

Subsequently, the redirect sever (the SIP server D) sends a response code ("REDIRECT") to the NFAX C together with the received location list (S410). The NFAX C then sends a method "INVITE" to the new address of the NFAX D (S411).

Figure 5:
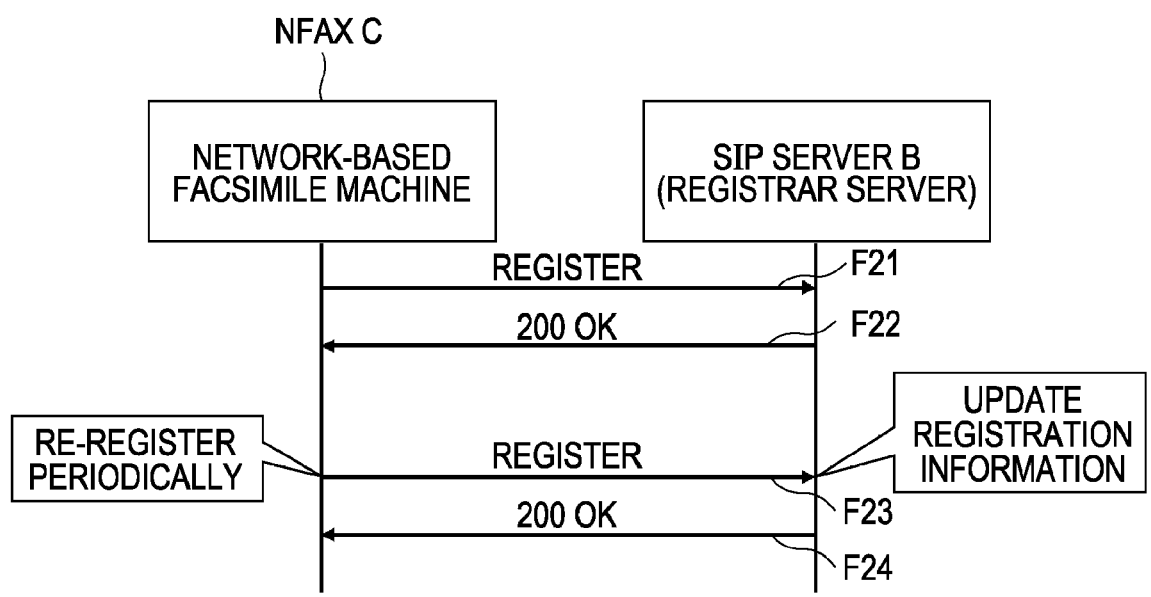
FIG. 5 illustrates a second data communication session in the network system illustrated in FIG. 2.

FIG. 5 illustrates a second data communication session in the network system illustrated in FIG. 2. In FIG. 5, a session flow is illustrated when an NFAX C registers the device information via the registrar server illustrated in FIG. 4.

As illustrated in FIG. 5, the NFAX C sends a REGISTER request to the SIP server B (the registrar server) (F21). The REGISTER request includes the SIP-URI (a "To" header), the device address (a "CONTACT" header), and an expiration date (an "Expires" header). The NFAX C inputs the IP address of the SIP terminal into the REGISTER request and, subsequently, transmits the REGISTER request. Thus, the IP address is registered with the location server. After the NFAX C receives a response 200 "OK" from the SIP server B (F22), the registration is completed.

The registration has an expiration date. When the expiration date has passed, the registration is canceled. Before the registration is canceled, a REGISTER request is re-transmitted to the SIP server B (F23). In this way, the registration information is periodically updated. After the NFAX C receives a response 200 "OK" from the SIP server B (F24), the registration update is completed.

In this manner, the latest address can be registered with the location server, and therefore, the image communication apparatus can receive the latest address at all times. In addition, when the image communication apparatus goes off-line, the registration can be canceled.

Forwarding Process Using Alternative Address

Figure 6A:
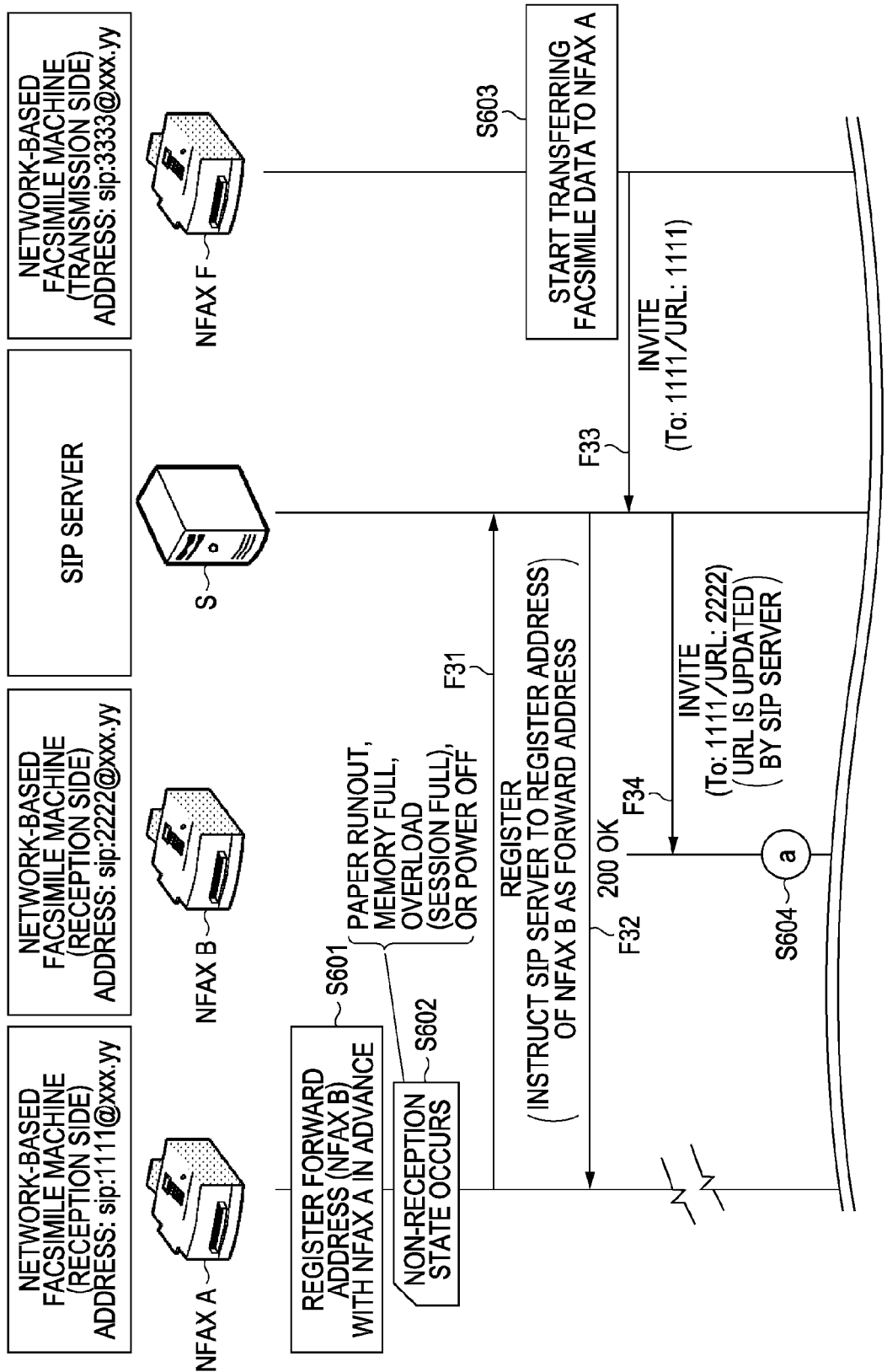
FIG. 6A illustrates a third data communication session in the network system shown in FIG. 2.
Figure 6B:
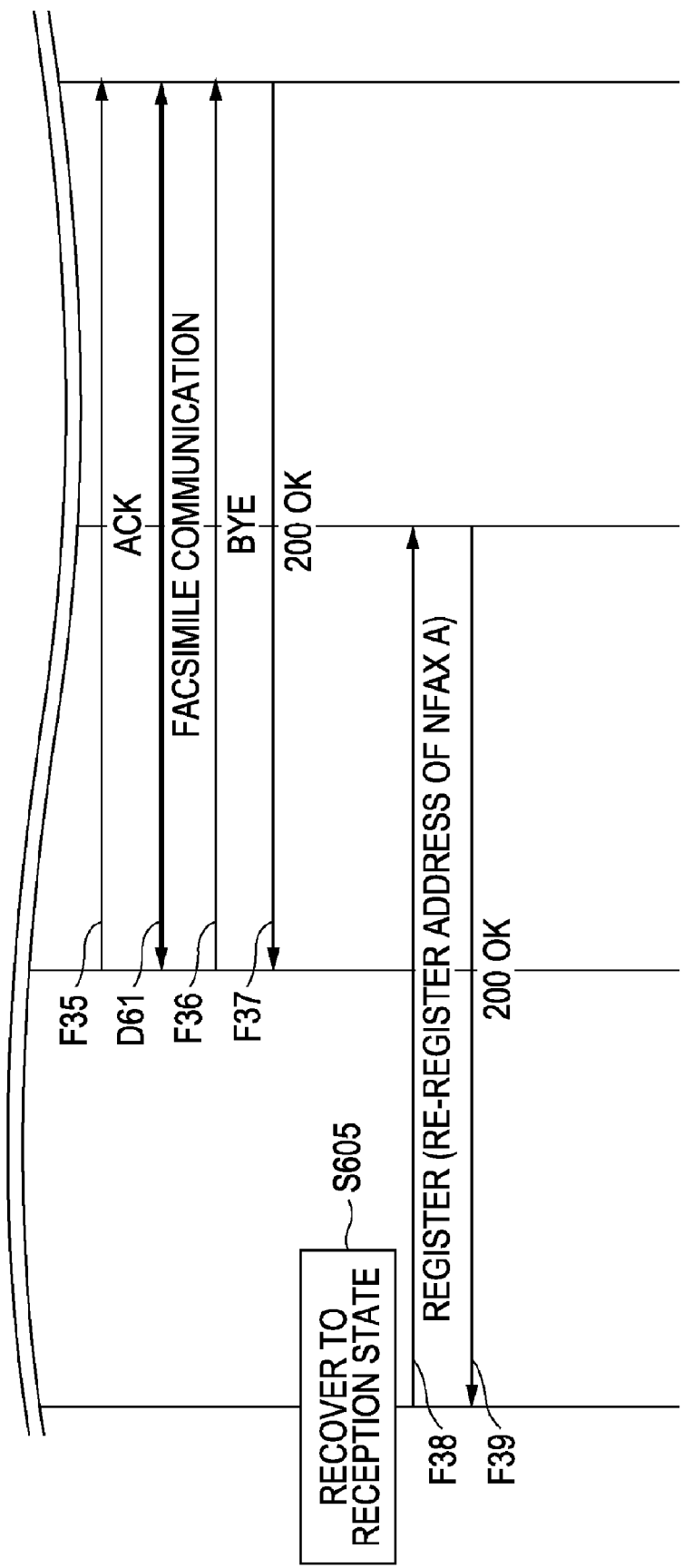
FIG. 6B is a continuation of the diagram shown in FIG. 6A.

FIGS. 6A and 6B illustrate a third data communication session in the network system illustrated in FIG. 2. An example of a data communication session flow performed in the network system shown in FIG. 2 is illustrated in FIGS. 6A and 6B. The sessions are represented by "F31" to "F39". The data communication step is represented by "D61". URI information "1111", "2222", and "3333" are registered with the location server for the NFAX A, the NFAX B, and, the NFAX F, respectively.

The NFAX A, the NFAX B, and, the NFAX F are connected to the SIP server S via a network. In this configuration, a user instructs transmission of image data from the NFAX F to the NFAX A via the SIP server S. However, at that time, the NFAX A may be incapable of reception for some reason. The alternative address of the NFAX A is the address of the NFAX B, which is registered with a redirect server in advance. Note that examples of a non-reception state of the NFAX A include a state in which print paper sheets have run out, a state in which the memory is full, and a state in which the power has been turned off.

The NFAX A stores the forward address that is input from the user in advance (S601). When the NFAX A becomes incapable of reception (S602), the NFAX A sends the forward address to the SIP server S using a REGISTER request (F31). The SIP server S registers the received address therewith as an alternative address (the address of the NFAX B in the present embodiment).

After the forward address is registered, the NFAX A receives a response 200 "OK" from the SIP server S (F32). In such a situation, the NFAX F calls the NFAX A for facsimile transmission (S603).

The SIP server S receives a method "INVITE" from the NFAX A (F33). This method "INVITE" includes "1111" corresponding to the information "To" and "1111" corresponding to the information "URI". The information "To" and "URI" are defined by SIP. The information "To" indicates the NFAX A that is specified as a destination NFAX by the user. The information "URI" indicates an NFAX to which a control signal, such as a method "INVITE", is actually sent. In F33, a value "1111", which corresponds to the NFAX A, is specified for each of the information "To" and information "URI".

Since "1111" is specified for the destination NFAX, the SIP server S attempts to receive information about the NFAX A. However, as described above, the NFAX A is in a non-reception state. In addition, the address of the NFAX B is registered with the SIP server S as the alternative address of the NFAX A.

Accordingly, the SIP server S forwards the method "INVITE" to the forward address NFAX B (F34). At that time, the method "INVITE" includes a value "1111" in the "To" field and a value "2222" in the "URI" field. That is, the SIP server S updates the URI address in the SIP information to "2222" corresponding to the NFAX B by using the information registered with the redirect server.

At step S604, the NFAX B sends an ACK message to the NFAX F on behalf of the NFAX A (F35), and therefore, the session between the NFAX F and the NFAX B is established normally. Subsequently, a facsimile communication is performed between the NFAX F and the NFAX B (D61).

Thereafter, the NFAX B submits a method "BYE" to the NFAX F (F36). In response to the method "BYE", the NFAX F returns a response code 200 "OK" to the NFAX B (F37). Thus, the session is terminated.

On the other hand, after the NFAX A detects that it is in a non-reception state, the NFAX A executes a process in accordance with the reason for the non-reception state so that the NFAX A returns to a reception state again (S605).

Subsequently, the NFAX A instructs the SIP server S to register the information about the NFAX A using a REGISTER request again (F38). After the SIP server S registers the information about the NFAX A therewith, the NFAX A receives a response 200 "OK" from the SIP server S (F39).

FIG. 7 is a flow chart illustrating a first data processing procedure performed by the image communication apparatus according to the present embodiment. In FIG. 7, a process is described in detail in which the NFAX B illustrated in FIG. 2 is specified by the NFAX A as an NFAX at a forward address and receives a forwarded document (see S604). The CPU 101 of the NFAX B loads the control program stored in the HDD 110 into the RAM 109 so that the process of each step of FIG. 7 is performed.

As illustrated in FIG. 6A, in the session between the NFAX B and the SIP server S, the NFAX B, at step S604, receives the SIP information from the SIP server S. The CPU 101 retrieves the "To" address and the "URI" address from the SIP information. Subsequently, the CPU 101 determines whether the "To" address is different from the "URI" address by comparing the two addresses (S701). If the "To" address is different from the "URI" address, the CPU 101 determines that the image data was originally sent to another image communication apparatus (S702). Thereafter, some of or all of the sub-processes in step S703 may be performed based on the SIP information.

At step S703, communication management information based on the "To" address and the "URI" address is recorded or displayed on a display unit (S703-a). Thus, the user of the NFAX B can determine whether the image data was originally destined for the NFAX B or another NFAX. Alternatively, the CPU 101 records or displays the number of received documents for each of the "To" addresses (S703-b). In addition, in order to respond to a polling request from the NFAX at the original address, the CPU 101 stores the received image data in the HDD 110 for each of the "To" addresses (S703-c). Furthermore, the CPU 101 adds image information (a mark) indicating that the image data is to be transmitted to another NFAX to the received image data. Subsequently, the CPU 101 prints the image data (S703-d). Still furthermore, before the CPU 101 starts printing the image data having the destination address of another NFAX, the CPU 101 requests the user to input a predetermined password (S703-e).

However, if, at S701, the CPU 101 determines that the "To" address is the same as the "URI" address, the CPU 101 determines that the document is to be forwarded thereto (S704). Accordingly, the CPU 101 performs a normal facsimile reception process such as printing the received data on a sheet or storing the received data into the HDD 110 (S705). Thereafter, the processing is completed.

In the case where the document is printed by the image communication apparatus at the forward address, the image communication apparatus may delete the image data of the document from the storage unit.

Figure 9:
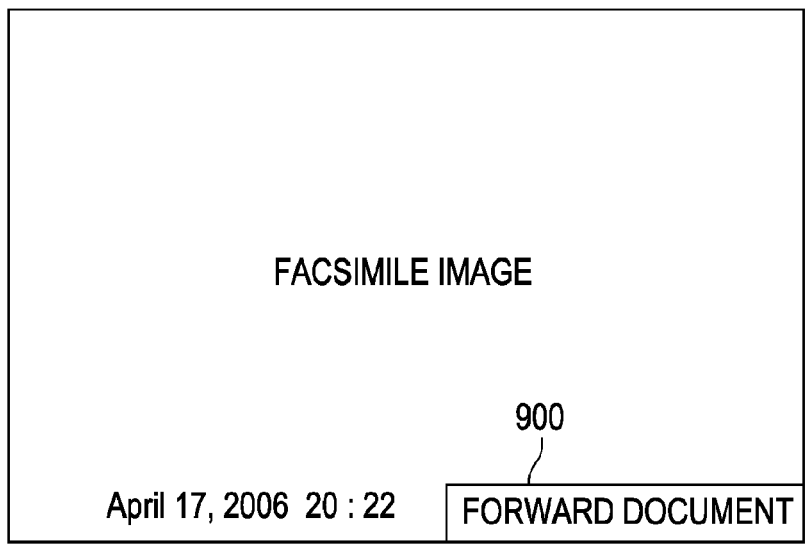
FIG. 9 illustrates an example printout of a communication management report of the image communication apparatus according to the first exemplary embodiment.

FIGS. 8 and 9 illustrate exemplary printouts of a communication management report of the image communication apparatus according to the present embodiment. In this example, a printout of the communication management report that is output at step S703-e in FIG. 7 is illustrated.

In this example printout, a reception time, the URI address, and a "From" address are printed for each of the "To" addresses.

FIG. 9 illustrates an example facsimile image having a mark 900 (the text "Forward Document" in this embodiment) indicating that the received document is forwarded, as described in step S703-d of FIG. 7, in the footer section of the printed image.

According to the present embodiment, when the image communication apparatus at the original destination address recovers from an error state, the image communication apparatus sends a polling request to the image communication apparatus at the forward address. In this way, after recovering from an error state, the image communication apparatus can acquire the data that was forwarded to another image communication apparatus, which is specified as an image communication apparatus at the forward address. According to the present embodiment, an image communication apparatus on the reception side can easily determine whether the image data received via a network was originally destined for it or another facsimile machine as a forwarded document. Thus, the user of the image communication apparatus is not confused about the received image data.

Figure 10:
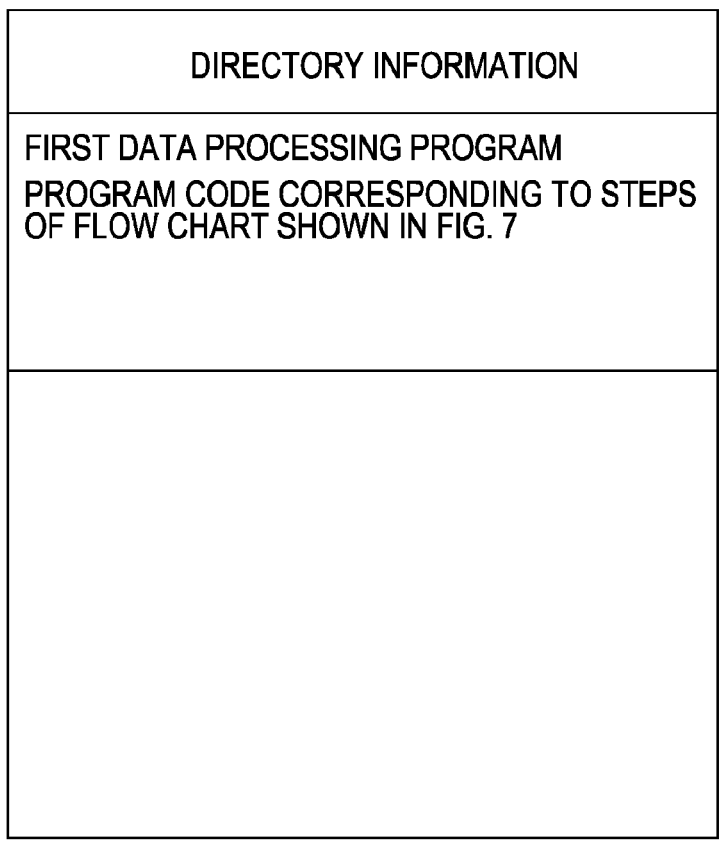
FIG. 10 illustrates a memory map of a storage medium for storing a variety of programs that are readable by the image communication apparatus according to the present invention.

An exemplary structure of a data processing program that is readable by the image communication apparatus according to another exemplary embodiment of the present invention is described below with reference to a memory map illustrated in FIG. 10.

Although not illustrated, information for managing the programs stored in the storage medium (e.g., the version information and the author) may be further stored in the storage medium. Still furthermore, information associated with the operating system (OS) that reads the programs (e.g., icons for identifying the programs) may be stored in the storage medium.

In addition, data used by a variety of programs are managed using a directory of the storage medium. Furthermore, a program for installing a variety of programs in a computer may be stored in the storage medium. Still furthermore, if the installation program is compressed, a program for decompressing the installation program may be stored in the storage medium.

The function according to the present embodiment described in FIG. 7 may be achieved by a host computer that executes an externally installed program. In such a case, the program and the associated data may be supplied to the host computer using a storage medium, such as a CD-ROM (compact disk-read only memory), a flash memory, or an FD (floppy disk), or an external storage medium via a network.

In this way, the storage medium stores the software program code that achieves the functions of the above-described exemplary embodiments. The storage medium is supplied to a system or an apparatus. The present invention can be achieved by causing a computer (central processing unit (CPU) or micro-processing unit (MPU)) of the system or apparatus to read and execute the software program code.

In such a case, the program code itself read out of the storage medium realizes the functions of the above-described embodiments. Therefore, the storage medium storing the program code can also realize the present invention.

Accordingly, any form of the program can be applied to the present invention. For example, the program may be a program executed using an object code or an interpreter, or script data supplied to the OS.

Examples of the storage medium for supplying the program code include a floppy disk, a hard disk, an optical disk, an MO (magnetooptical disk), a CD-ROM, a CD-R (CD recordable), a CD-RW (CD-rewritable), a magnetic tape, a nonvolatile memory card, a ROM, and a DVD (digital versatile disc).

Alternatively, the program code may be supplied by accessing a Web page on the Internet using a browser in a client computer and downloading the computer program of the present invention or an archive file including an auto-install function from the Web page to a recording medium, such as a hard disk. In addition, the program code of the program of the present invention may be divided into a plurality of files, which may be downloaded from different Web pages. In other words, a WWW (world wide web) server and an FTP (file transfer protocol) server that allow a plurality of users to download a program file that achieves the functions of the present invention are also included in the present invention.

Additionally, the program according to the present invention can be encrypted and stored into a storage medium, such as a CD-ROM, to deliver it to users. A user who satisfies a predetermined criterion can download key information for decrypting the encryption from a Web page on the Internet. By using the key information, the user can install the encrypted program in a computer and can execute the program to achieve the present invention.

The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-344394 filed Dec. 21, 2006, which is hereby incorporated by reference herein in its entirety.

What is claimed is:

1. An image communication apparatus capable of communicating with external apparatuses, comprising:
a receiving unit configured to receive image data from the external apparatuses;
a determining unit configured to determine whether image data received by the receiving unit is a first type of image data that was to be transmitted to the image communication apparatus or a second type of image data that was to be transmitted to other image communication apparatuses; and
a processing unit configured to perform processing based on a determination result of the determining unit, wherein the receiving unit receives the image data by communicating with the external apparatuses using a session initiation protocol, wherein the determining unit makes a determination by determining whether first address information defined by the session initiation protocol is the same as second address information defined by the session initiation protocol and wherein the first address information defined by the session initiation protocol is a TO address, and the second address information defined by the session initiation protocol is a URI address.

2. The image communication apparatus according to claim 1, wherein, in a case where an address of the other image communication apparatus is registered with a server as a forward address of image data that was to be transmitted to the other image communication apparatuses, the second type of image data is transferred to the image communication apparatus.

3. The image communication apparatus according to claim 1, further comprising:
a storage unit configured to store image data received by the receiving unit;
wherein the processing performed by the processing unit involves storing the image data in the storage unit while distinguishing the first type of image data from the second type of image data based on a determination result of the determining unit.

4. The image communication apparatus according to claim 1, further comprising:
an output unit configured to output a management report concerning the image data received by the receiving unit;
wherein the processing performed by the processing unit involves causing the output unit to output the management report, and
wherein the first type of image data is distinguished from the second type of image data based on a determination result of the determining unit.

5. The image communication apparatus according to claim 1, further comprising:
a printing unit configured to print the image data received by the receiving unit;
wherein the processing performed by the processing unit involves adding image information to the image data, indicating that the image data is of the second type based on a determination result of the determining unit when the image data of the second type is printed.

6. A method for controlling an image communication apparatus capable of communicating with external apparatuses, the method comprising:
receiving image data from the external apparatuses;
determining whether received image data is a first type of image data that was to be transmitted to the image communication apparatus or a second type of image data that was to be transmitted to other image communication apparatuses; and
performing processing based on the result of the determination, wherein image data is received by communicating with the external apparatuses using a session initiation protocol, wherein a determination is made by determining whether first address information defined by the session initiation protocol is the same as second address information defined by the session initiation protocol and wherein the first address information defined by the session initiation protocol is a TO address, and the second address information defined by the session initiation protocol is a URI address.

7. The method according to claim 6, wherein, in a case where an address of the other image communication apparatus is registered with a server as a forward address of the image data that was to be transmitted to the other image communication apparatuses, the second type of image data is transferred to the image communication apparatus.

8. The method according to claim 6, further comprising:
storing received image data in a storage unit;
wherein the processing involves storing the image data in the storage unit while distinguishing the first type of image data from the second type of image data based on a determination result.

9. The method according to claim 6, further comprising:
outputting a management report concerning received image data;
wherein the processing involves outputting the management report, and
wherein the first type of image data is capable of being distinguished from the second type of image data based on a determination result.

10. The method according to claim 6, further comprising:
printing received image data;
wherein the processing involves adding image information to the image data, indicating that the image data is of the second type based on a determination result when the image data of the second type is printed.

* * * * *